United States Patent [19]
Lovejoy

[11] 3,930,780
[45] Jan. 6, 1976

[54] INJECTION MOLDING APPARATUS FOR PARTITIONED CONTAINERS

[75] Inventor: Walter R. Lovejoy, Elmhurst, Ill.

[73] Assignee: Beatrice Foods Co., Chicago, Ill.

[22] Filed: July 20, 1973

[21] Appl. No.: 381,144

[52] U.S. Cl. .................. 425/249; 425/438; 425/441
[51] Int. Cl.² ....................... B29C 7/00; B29F 1/00
[58] Field of Search ........... 425/249, 242, 438, 441, 425/443, 450, 468

[56] References Cited
UNITED STATES PATENTS

| | | | |
|---|---|---|---|
| 3,509,603 | 5/1970 | Halsall et al. ........................ | 425/249 |
| 3,564,660 | 2/1971 | Darnell ............................... | 425/249 |
| 3,585,690 | 6/1971 | Tucker ............................ | 425/249 X |

*Primary Examiner*—Robert D. Baldwin
*Assistant Examiner*—Carl Rowold
*Attorney, Agent, or Firm*—Hume, Clement, Brinks, Willian, Olds & Cook, Ltd.

[57] ABSTRACT

An injection mold is disclosed for making an article having a plurality of side walls defining an enclosure. The mold elements during opening and closing of the mold move in a coordinated manner via mechanical interlocks. A first mold section carries plural side wall members that slide between a closed position and an open position. A second mold section interlocks with the side wall members to carry them from their closed to their open position and the side wall members are themselves linked to a stripper ring that strips the article from the mold. Other features are disclosed.

5 Claims, 7 Drawing Figures

INJECTION MOLDING APPARATUS FOR PARTITIONED CONTAINERS

INTRODUCTION

The present invention relates generally to apparatus for manufacture of injection molded plastic articles. More particularly, the invention is directed to new and improved apparatus for injection molding partitioned containers, such as battery casings or the like.

SUMMARY OF THE INVENTION

The invention molding apparatus of the invention is of a comparatively simple and economical construction while also affording exceptional operational reliability. The mold utilizes a system of mechanical interlocks between the individual mold and components to establish the required coordinated movement therebetween as opposed to the hydraulic cylinder mechanisms typically used in the prior art.

Accordingly, the invention is directed to an injection mold for manufacture of an article having a plurality of side walls defining an enclosure. Specifically, the mold comprises a first mold means including a first base member and a plurality of side wall members movable between a closed position in which the side wall members are adjacent to the base member and cooperatively form a mold cavity conforming to the desired exterior dimensions of the enclosure and an open position in which the side wall members are displaced along a predetermined angular path relative to the side walls of the article away from the base member and laterally outwardly from one another. Second mold means comprises a second base member movable between a closed position abutting one end of each of said side wall members and an open position in which the second mold means is displaced relative to the first mold means by a predetermined distance and along a path parallel to the side walls of the article. A stripper ring means comprises a ring member of interior peripheral dimensions corresponding to the perimeter of the article and disposed adjacent the end of the side wall members opposite the aforesaid one ends and mechanically interlocked with the side wall members for coordinated movement therewith and for engagement of the adjacent ends of the side walls of the molded article to strip the article from the mold upon movement of the side wall members from the closed to the open position. There is further provided an interlock means for mechanically coupling the side wall members to the second mold means for coordinated movement from the closed position toward the open position of the second mold means and for releasing the side wall members from the second mold means at approximately the open position of the side wall members and for permitting continued movement of the second mold means to its open position.

BRIEF DESCRIPTION OF THE DRAWINGS

The novel features of the present invention are set forth with particularity in the appended claims. The invention together with further objects and advantages thereof may best be understood, however, by reference to the following description taken in conjunction with the accompanying drawings in the several figures of which like reference numerals identify like elements and in which:

DESCRIPTION OF THE PREFERRED EMBODIMENTS

Figure 1:
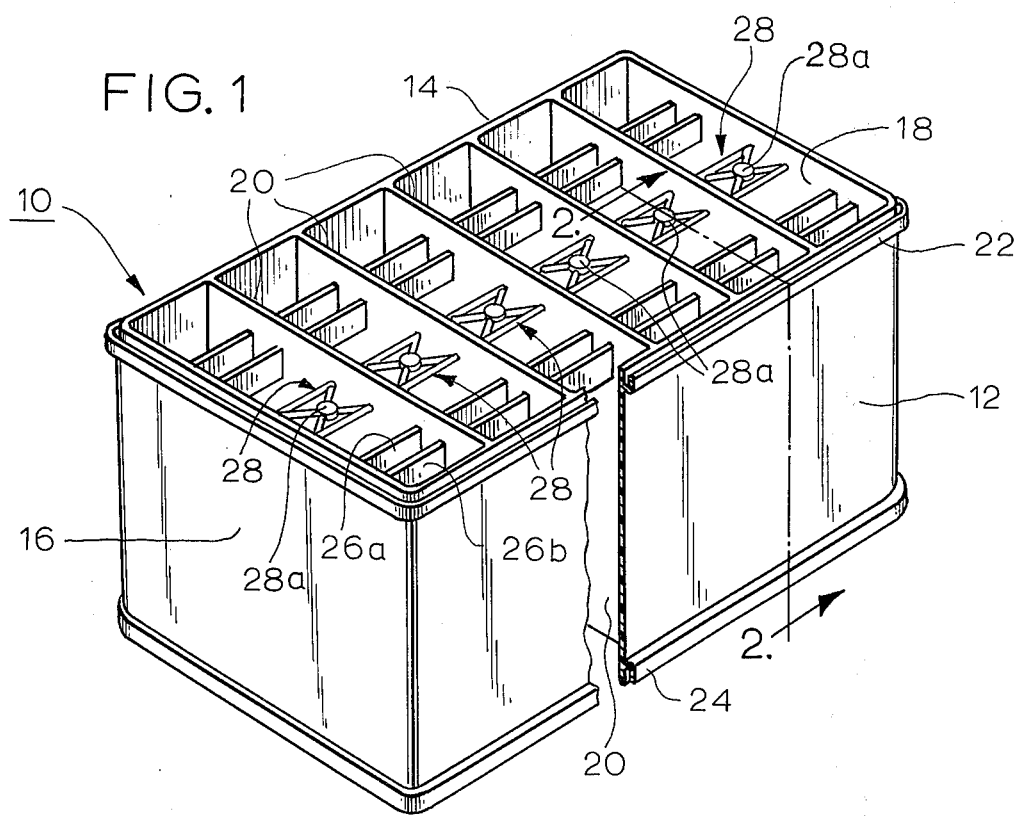
FIG. 1 is a perspective view of a plastic article, namely, a portion of a battery casing, manufactured by the injection mold apparatus of the present invention.
Figure 2:
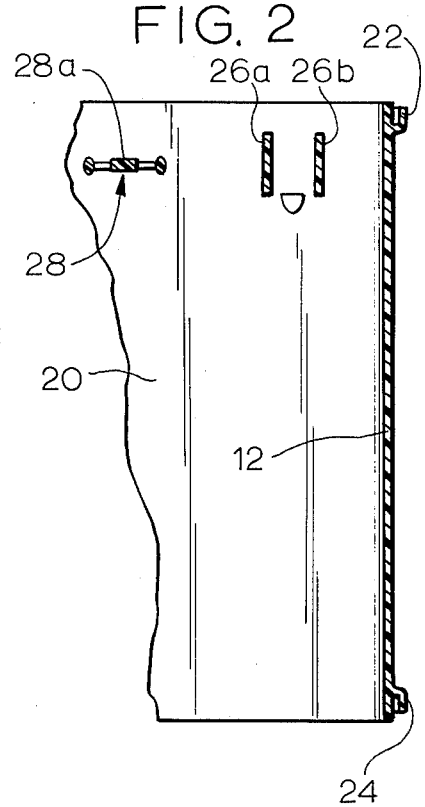
FIG. 2 is an enlarged, detail view of a part of the battery casing and taken along lines 2—2 of FIG. 1.

Referring now to FIG. 1, there is illustrated a molded plastic article 10 manufactured by the mold apparatus of the invention presently to be described. The article 10 comprises a portion of a battery casing of the type typically used in the manufacture of electric storage batteries for automobiles. The rectangular casing portion 10 includes first and second pairs of opposed side walls 12, 14 and 16, 18, respectively, and, as seen in the drawing, has an open top and a similarly open bottom (not visible in the drawing). A plurality of parallel and equally spaced partition walls 20 extend between the side walls 12 and 14 and are integrally formed therewith, the partition walls being effective to divide the peripheral enclosure formed by the outer walls into a plurality of equal sized cells. Peripheral flange portions 22 and 24 of like construction are integrally molded adjacent the top and bottom, respectively, of the casing portion 10 and are useful in effecting a proper interfit with top and bottom covers (not shown). The top and bottom covers are separately molded by methods and apparatus not pertinent to the present invention.

The casing portion 10 further includes along the length of the casing adjacent each of the side walls 12 and 14 a series of integrally molded plastic supports each formed by two parallel struts as depicted by the exemplary support struts 26a, 26b for securely holding lead metal connector slugs (not shown) that electrically interconnect the plural cells of the casing portion 10. The metal connector slugs or inserts are actually disposed in the mold during the molding process so that the plastic supports are intimately formed thereabout and the connector is securely positioned in a proper location. The structures of the connectors themselves, their particular location in the casing 10 and the manner and techniques for disposing them in the mold are accomplished by procedures that are familiar to those skilled in the art. Accordingly, the connectors have been omitted from the drawing of FIG. 1 for simplicity and to promote clarity and for like reasons a description of their disposition in the mold is omitted. The identical plastic supports are, however, themselves illustrated; the exemplary support comprises a pair of parallel plastic segments 26a, 26b extending between a partition wall 20 and the adjacent end wall 16. Similar supports are disposed respectively between each of the adjacent partition walls and the end wall 18 in axial alignment with the exemplary support 26a, 26b to define a first series of connector support while a second series of such supports are located between the partition walls and end walls in parallel, adjacent relationship to the opposite side wall 14.

The casing portion 10 further includes an integrally formed plastic lattice work disposed intermediate the opposed side walls 12 and 14 and extending between respective adjacent pairs of the partition walls 20 and between these partition walls and the respective end walls 16 and 18. The thermoplastic material to form the casing portion 10 is injected into the mold apparatus at respective points corresponding to the central pads 28a of each of the lattice work elements 28. The gating method and techniques for introducing the thermoplastic material into the mold apparatus of the invention are conventional and accordingly will not be described in detail herein.

Figure 3:
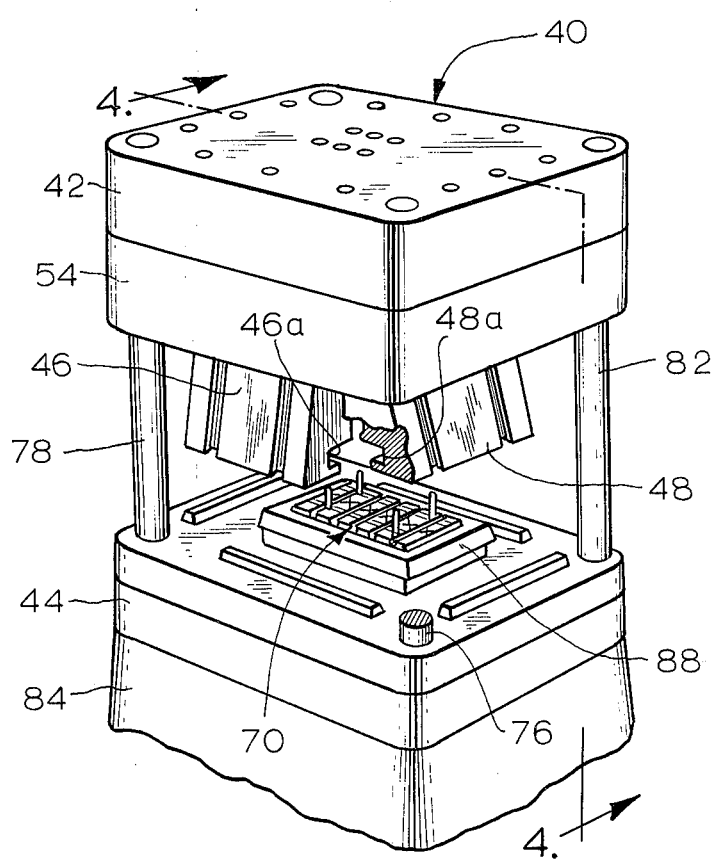
FIG. 3 is a perspective view of the mold apparatus of the invention shown in its open position with a molded casing having just been ejected therefrom.

Referring now to FIG. 3, the mold apparatus 40 of the invention there illustrated comprises a pair of separable mold sections or platens which in their closed position cooperatively define a mold cavity corresponding to the article of FIG. 1 but which separate to an open position as shown in FIG. 3 to permit ejection of a completed article therefrom. Although it will be understood that the apparatus 40 may, consistent with the present invention, be arranged for use in any of a wide variety of injecting molding machines, the mold apparatus 40 is herein illustrated as arranged for use in a Stokes type vertical injection molding machine (not shown).

Figure 5:
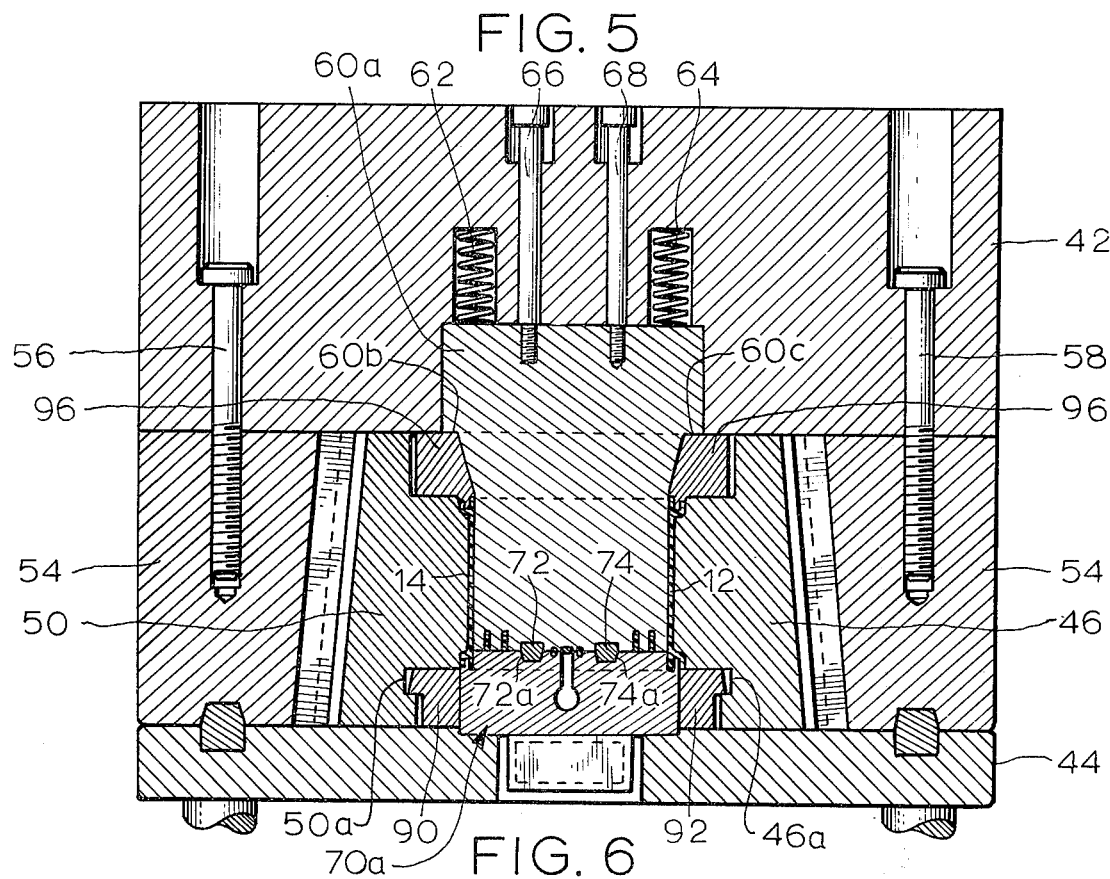
FIG. 5 is a cross-section view transverse to that of FIG. 4 and taken along lines 5—5 of FIG. 4; but showing the mold in its fully closed or molding position with thermoplastic material having been injected within the mold cavity to form a casing therein.

The mold apparatus 40 comprises a first mold means including a first base member or upper platen 42 that is fixedly mounted to the injection molding machine (not shown). A second mold means comprising a second base member or lower platen 44 is movable along a vertical path between its fully open position as seen in FIG. 3 and a fully closed position as seen in FIG. 5. As will presently become apparent to those skilled in the art, it is only a matter of convenience as to which of the mold platens 42,44 actually moves as long as there is the requisite relative movement between the mold platens.

The first mold means in addition to the base member 42 further includes four side wall members disposed on the underside of the base member 42 and vertically movable relative thereto, a first pair of the side walls 46 and 48 being visible in FIG. 3 in their fully open position. A second pair of side wall members 50 and 52 that are respectively identical to members 46 and 48 are visible in the sectional views of FIGS. 4 and 5. Although not specifically shown, it will be understood that the side wall members 50, 52 in their open position occupy a location similar to that of the side walls 46, 48 and furthermore, as will presently be explained, all of the side wall members move between their open and closed positions in a coordinated fashion.

The side wall members in their closed positions, as seen in FIG. 5 wherein side wall members 46 and 50 are visible, cooperatively form a rectangular mold cavity enclosure conforming to the desired exterior dimensions of the plastic battery casing 10. In movement to their open position, the four side wall members are displaced along a predetermined angular paths relative to the side walls of the casing 10 so as to move away from the underside of the first base member and laterally outwardly from one another and thereby release the molded plastic article. The path of movement of the four side wall members is established by the inclination or slope of their outer surfaces and the matched slope of a surrounding rectangular yoke member 54 that carries each of the side wall members for slidable movement between their open and closed positions. The rectangular yoke enclosure 54 is fixedly secured to the first base member 42 as for example by bolts. A pair of such bolts, 56 and 58, journaled in the first base member 42 and threadably secured to the yoke 54 are depicted in FIG. 5.

Figure 6:
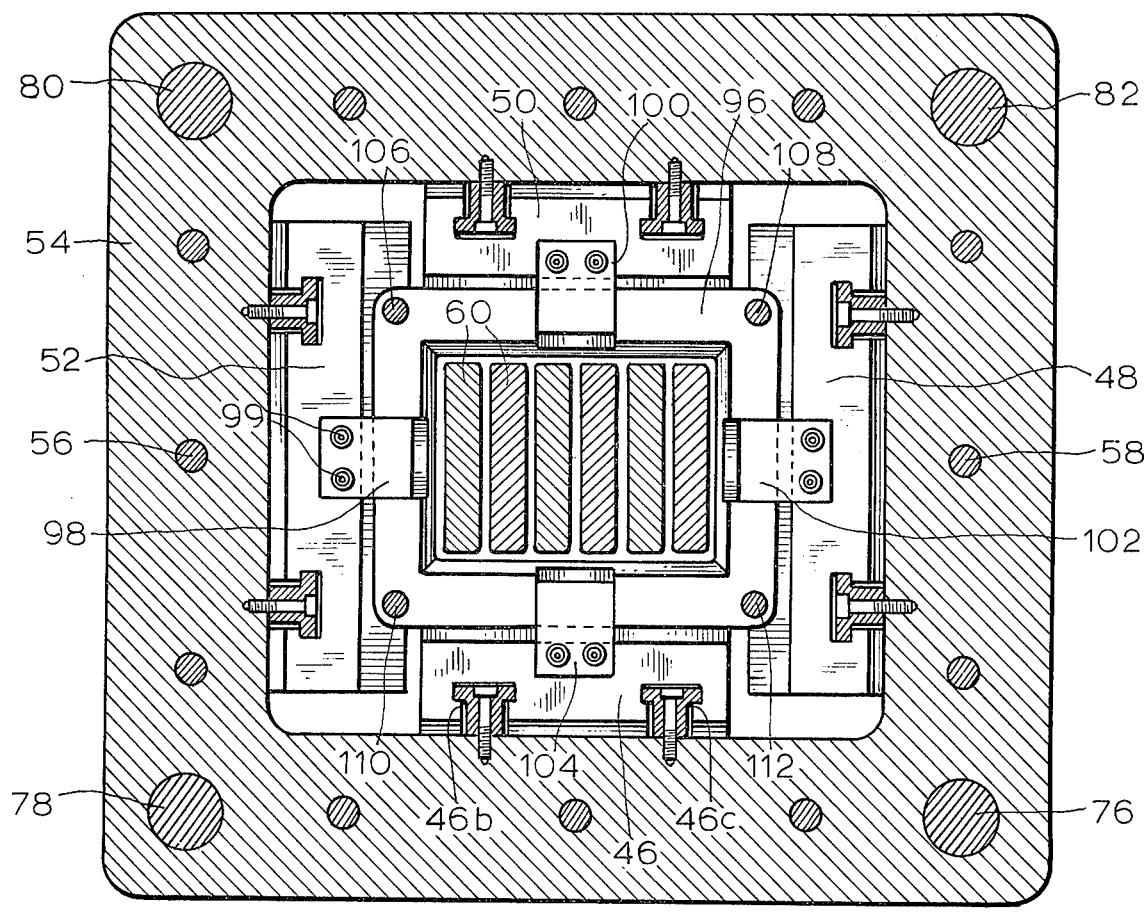
FIG. 6 is a cross-sectional view of the mold apparatus taken along lines 6—6 of FIG. 4.

Each of the side wall members 46, 48, 50 and 52 is slidably interconnected with the yoke 54 through conventional T-type tongue and groove interlocks as seen most clearly in FIG. 6 with reference to the exemplary side wall 46 and its associated interlocks 46b and 46c. The tongue and groove interconnections are each effected so as to cause the side wall members to lift clear of a contiguous relationship with the yoke 54 upon a small initial sliding movement of the side walls from their closed position toward their open position. In other words, the mated slopes of the tongue and groove interconnections are slightly less than the outward slope of the yoke 54 such that the side walls are contiguous the yoke only when seated in their closed position, but gradually lift out of contact with the yoke as the side walls are moved toward their open position, thereby to prevent galling of the facing surfaces of the side wall members and the yoke 54. Thus, only the tongue and groove surfaces of the side wall and yoke engage during the bulk of the movement of the side walls between their open and closed positions.

As additionally seen in FIG. 6, each of the side wall members 46, 48, 50 and 52 is of a generally rectangular configuration. The side wall members 46, 50 extend only along a partial length of each opposing side of the cavity while the longer pair of side wall members 48, 52 extend the full length of their respective cavity sides and around the end corners of the cavity thereby to abutt the respective side wall segments 46, 48 along a straight side portion of the cavity rather than at the corners.

Figure 4:
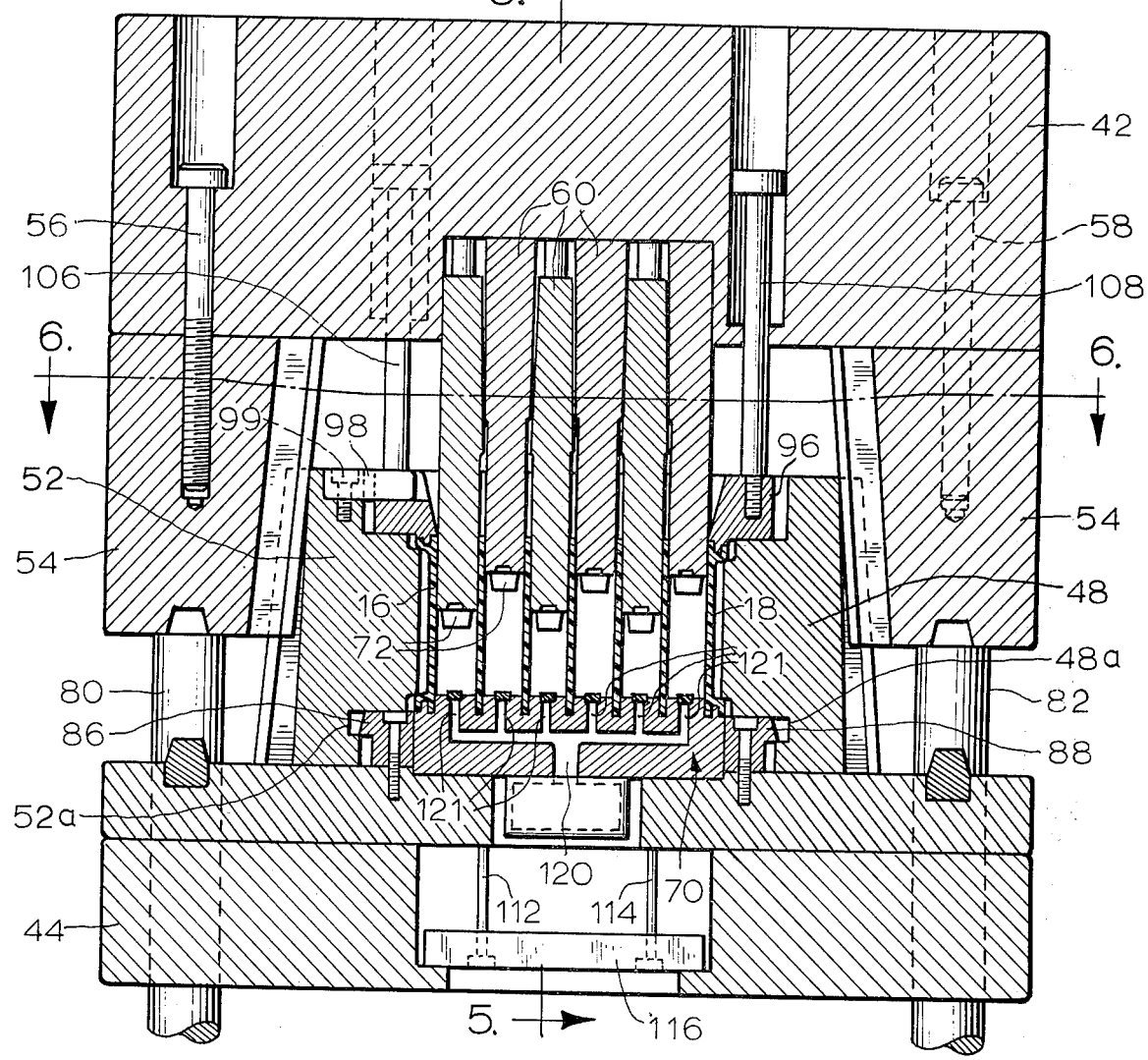
FIG. 4 is a cross-sectional view of the mold apparatus taken along lines 4—4 of FIG. 3 but showing the mold apparatus in movement toward an open position with the molded plastic casing being stripped from the core elements of the upper mold section.

The internal partition walls 20 of the article 10 are formed by providing within the enclosure defined by the mold side wall members a plurality of core elements spaced predetermined distances from one another and from the four side wall members corresponding in dimension to the desired thicknesses of the side and partition walls. The core elements are in fact composed of first and second sets of core elements rigidly secured respectively to the upper and lower mold platens 42 and 44 and adapted to interfit with one another in a properly aligned relationship. The first set of core elements, comprising in the present exemplary embodiment six individual core components, are seated in a rectangular recess in the upper mold platen 42 as seen in FIGS. 4 and 5. The individual ones of the first set of core elements 60 each include a portion projecting into the mold cavity defined by the side walls 46, 48, 50 and 52 and a support portion extending outside of the mold cavity and into the recessed face of the first mold platen 42. As illustrated in FIGS. 4 and 5, the support portions of the core elements 60 are of complementary wedge shaped contours so as to facilitate relative sliding motion between each of the core components. In this regard, it will be observed in FIG. 4 that the second, fourth and sixth core components of the first set 60 are rigidly secured to the first base member 42 while the odd numbered core components, i.e., one, three and five, are movable from closed positions in registry with the even numbered core elements as seen in FIG. 5 to open positions as seen in FIG. 4 wherein the odd numbered core elements have moved downwardly by a predetermined short distance.

The structural mounting of the odd numbered core elements to permit longitudinal movement as aforesaid, is illustrated in FIG. 5. As there seen, an exemplary odd numbered core component 60a is situated in its closed position with its upper support disposed in the recess of the first mold platen 42. Coil springs 62 and 64 are disposed in respective recesses of the platen 42 above the core component 60a so as to tend to force it downwardly toward its open position. A pair of guide and limit bolts 66 and 68 are loosely journaled in the platen 42 and are threadably secured to the exemplary odd numbered core component 60a. The bolts 66, 68 limit downward travel of the core component 60a to a predetermined distance corresponding to the space between the base of the illustrated bolt recess in the platen 42 and the enlarged head portions of the respective bolts 66, 68. The exemplary odd numbered core component 60a and its similar odd numbered counterparts are held in a closed position against the bias of the springs 62, 64 by the action of a mold component associated with the side wall members 50, 52 engaging peripheral shoulder portions 60b, 60c of the core component 60a, as seen in FIG. 5. However, movement of the side wall members toward their open position causes the odd numbered core components to be released thereby permitting them to move to their respective open positions.

The second set of core elements 70 and an exemplary component 70a of the second set are seen most clearly in FIGS. 4 and 5. As seen in these figures, the first set of core elements 60 extend over the major length of the mold cavity while the second set 70 extend upwardly into the mold cavity only a comparatively short distance, but are aligned with the components of the first set so as to effect a properly registered and severable connection with the components of the first set.

The second set of core elements 70 may be formed from a singular block fixedly secured to the second mold platen 44 and having milled slots in its upper surface corresponding in width to the desired thickness of the partition and side walls of the article 10. It is important that the individual elements of the first and second sets of core elements 60 and 70, respectively, interlock securely with one another so that the extreme hydraulic pressures encountered during the molding operation will not cause deflection of the elongated first set of core elements 60 and resultant distortion in the partition and side wall thicknesses. To this end, each of the core elements of the first set 60 includes a pair of spaced nose portions of generally trapezoidal cross-section which seat in corresponding recesses of the core elements of the second set 70. In FIG. 5, the spaced nose portions 72 and 74 of the exemplary core element 60a are shown situated in contoured recesses 72a and 74a respectively of the exemplary lower core element 70a. It will be understood that all of the core elements of the first and second sets interlock in like fashion.

The second or lower mold platen 44 is movable relative to the mold platen 42 along a path determined by four parallel guide posts 76, 78, 80 and 82 that are slidably journaled in respective bores located adjacent the four corners of the mold platen 44. The four posts are rigidly secured to a lower base member 84 and at their upper ends are secured in appropriately dimensioned bores of the rectangular yoke member 54, as seen in FIG. 6. Movement of the platen 44 along the four guide posts between its open and closed positions is controlled by means of conventional hydraulic apparatus (not shown).

In accordance with the invention, an interlock means is provided for mechanically coupling the four side wall members 46, 48, 50 and 52 to the second mold means 44 to effect a coordinated movement of the side walls from their closed position to their open position whereat the interlock is released so as to permit continued movement of the second mold means 44 to its fully open position. Specifically, this interlock means comprises first interlock members integral with the four side wall members and comprising the respective transverse notches 46a, 48a, 50a and 52a near the lower ends of the corresponding side wall members. The horizontal or lateral notches from abutments or shoulders for engaging complementary shoulder portions of second interlock means that are secured to the second mold platen 44. Second interlock members engaging side wall interlock members 52a and 48a are depicted by numerals 86 and 88 in FIG. 4 while in FIG. 5 second interlock means 90 and 92 are depicted in engagement with the first interlock means 50a and 46a. The second interlock means 86, 88, 90 and 92 are each of identical cross-section comprising inverted L-shaped members in which the laterally extending leg of each L-member overlies the corresponding shoulder portion of the associated first interlock means. Specifically, with the mold in its fully closed position as seen in FIG. 5, the first and second interlock members 90. 50a and 92, 46a there visible are seen to be in a fully overlapped condition; the remaining interlock members not visible in the drawing are similarly disposed.

Figure 4A:
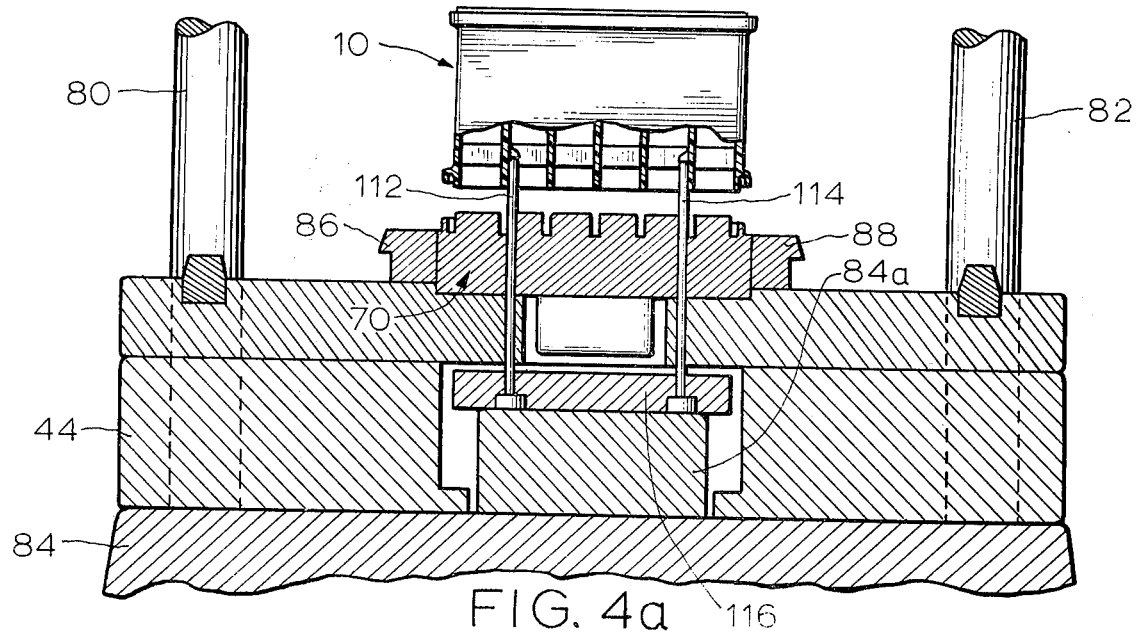
FIG. 4a is a sectional view similar to that of FIG. 4 but showing the lower half of the mold apparatus in its open position and with the molded battery casing being ejected from the core elements of the lower mold section by the action of upwardly projecting ejector rods.

Any downward movement of the lower mold platen 44 will result in each of the four side walls 46, 48, 50 and 52 being drawn downwardly with the second mold platen 44 by virtue of the interconnection of the interlock members. However, as seen in FIG. 4, downward movement of the second mold member 44 also results in an angular outward movement of each of the four side walls thereby progressively reducing the overlap of the four sets of first and second interlock members. In FIG. 4, the shoulder portions 48a, 52a of the corresponding side walls 48, 52 have moved outwardly by a substantial amount so as to be just barely engaged by their corresponding second interlock members 86 and 88, respectively. With slight additional downward movement of the mold platen 44, the side wall members will all concurrently move to a sufficient laterally outward position so as to release the interlocks between each side wall and the second mold means 44. The second mold means 44 thereafter continues in a downward movement to its fully open position as seen in FIG. 4a.

The outward movement of the four side wall members 46, 48, 50 and 52 during opening of the mold releases these side walls from the molded article. However, it is still necessary to strip the molded article from the first set of core elements 60. This is accomplished by provision of a stripper ring means comprising a rectangular ring member 96 of interior peripheral dimensions corresponding to the perimeter of the article 10 and disposed adjacent the end of the side wall members contiguous the underside of the first mold platen 42. The stripper ring 96, seen most clearly in FIG. 5, overlies the upper end of the mold cavity so as to bear on the perimeter of the upper end of the molded article.

As seen in FIG. 4, the stripper ring 96 seats in complementary notches formed in each of the four side wall members and furthermore is interlocked to each of the side wall members. One of these interlocks comprising a rigid bar member 98 secured to the side wall 52 by bolts 99 and extending an overlying relation to the stripper ring 96 is seen in FIG. 4. Corresponding interlock members 100, 102 and 104 secured respectively to side walls 50, 48 and 46 and extending in overlying relation to the stripper ring 96 are seen in FIG. 6. It will be observed that the side walls and the stripper ring 96 are both appropriately notched so as to seat the interlock bars 98, 100, 102 and 104 flush with the co-planar top surfaces of the side walls and the stripper ring 96. Although the stripper ring 96 is interlocked to the side wall members for vertical movement, it will be understood that the stripper ring may move laterally independently of the side walls.

In order to properly guide stripper ring 96 and also to limit downward travel of the stripper ring and interlocked side walls members there is provided a limit means. Preferably, the limit means comprises four bolts, two of which 106 and 108 are visible in FIG. 4. The bolts 106 and 108 and the two companion bolts 110 and 112 (FIG. 6) are loosely journaled in recessed bores of the first platen 42 with their lower ends threadably secured to the stripper ring 96 adjacent each of its four corners. The limit of downward travel of the stripper ring 96 and the interlocked side wall members is determined by the interception of the heads of the bolts 106, 108, 110 and 112 with the base of the recessed bores in the platen 42. The bolts 106, 108 and the two similar bolts 110 and 112 are secured only to the stripper ring 96 and thus the side walls 46, 48, 50 and 52 are not restricted in their lateral movement.

Once the molded plastic article has been stripped from the first set of core members 60, it is necessary to complete the ejection of the article from the mold by displacing the article from the second set of core elements 70. To this end, there is provided an ejector means supported by the second mold means 44 and comprising a series of ejector rods, two of which 112 and 114 are visible in the drawings. The ejector rods 112, 114 and the additional rods (not visible in the drawing) are slidably journaled in bores in the mold means 44 and are secured at their lower end to a transverse ejector plate 116. The ejector plate 116 is normally disposed in its lower most position shown in FIG. 4 with the upper ends of the ejector pins 112 and 114 flush with the surface of the mold cavity. Downward movement of the second mold means 44 so as to bring the ejector plate 116 into engagement with a pedestal portion 84a of the base 84 results in the ejector pins 112, 114 being displaced upwardly so as to push the battery casing 10 off of the core members, as seen in FIG. 4a.

The particular mechanism for introducing the thermoplastic material into the mold cavity forms no part of the present invention. However, for the sake of completeness, the technique for gating the mold cavity is illustrated in semischematic fashion in FIG. 4. Specifically, the thermoplastic material enters the mold apparatus 40 at a heated primary inlet sprue 120 disposed on the underside of the second mold member 44 and from there is coupled through a plurality of parallel hot runner channels 121 to respective inlet gates intermediate each of the pair of partition walls corresponding in position to the points 28a of the article 10 of FIG. 1.

The operation of the mold structure of the invention may be best understood by referring again initially to FIG. 5. The mold as there shown is in its closed position with the thermoplastic material having been injected therein through the main inlet sprue 120 and the parallel hot runner gates just described.

When the molded article has solidified, the lower mold platen 44 is actuated so as to move downwardly from the upper mold platen 42 as seen most clearly in FIG. 4. Downward movement of the mold platen 44 results in each of the four side walls 46, 48, 50 and 52 being drawn downwardly at a corresponding vertical rate by virtue of the mechanical interlock between the side walls and the lower mold platen 44. Two of the interlock members 86, 88 on the lower mold platen 44 and the corresponding shoulder portions 52a and 48a of the side walls 52 and 48 are seen in FIG. 4. The downward movement of the mold platen 44 and the interlocked side wall members also results in a downward movement of the stripper ring 96. The stripper ring 96 engages the periphery of the upper end of the molded article 10 and strips the article from the first or upper set of core elements 60. This stripping occurs in a progressive fashion by virtue of the fact that the odd numbered core elements are initially free to move downwardly with the stripper ring and at a like rate. Thus, initially the battery casing is stripped only from the stationary or even numbered core elements of the first set 60. However, once the odd numbered core elements have moved to their lower limit positions as determined by the limit bolts secured to each of these movable core elements, the stripper ring initiates stripping of the article from these additional core elements.

The interlocked downward movement of the mold platen 44, the side wall members and the stripper ring 96 continues until the article 10 is fully stripped from each of the core components of the first set of core elements 60. Thereafter, the interlocks between the side walls and the lower mold platen 44 clear to permit continued downward movement of the mold platen 44. Substantial additional downward movement of the side wall members is precluded by the limit bolts associated with each side wall, limit bolts 106 and 108 for the side walls 52 and 48 being visible in FIG. 4.

The lower mold platen 44 continues in its downward path causing the ejector plate 116 to intercept the pedestal 84a of the base plate 84 thereby moving the ejector pins 112 and 114 upwardly so as to lift the molded casing 10 off of the second or lower set of core components 70, all as seen in FIG. 4a. The molded article 10 is then withdrawn either manually or by appropriate mechanical apparatus from the mold and the mold apparatus is ready for return movement to its closed position and initiation of a successive operational cycle.

While particular embodiments of the present invention have been shown and described, it is apparent that various changes and modifications may be made, and it is therefore intended in the following claims to cover all such modifications and changes as may fall within the true spirit and scope of this invention.

I claim:

1. An injection mold for manufacture of an article having first and second pairs of opposed sidewalls defining a generally rectangular enclosure with an open top and bottom and having a plurality of partition walls extending between one of said pairs of opposed sidewalls for dividing said enclosure into a plurality of cells, comprising:

first mold means including a first base member and four sidewall members being movable between a closed position in which said four sidewall members are adjacent said first base member and cooperatively form a rectangular mold cavity conforming to the desired exterior dimensions of said generally rectangular enclosure and an open position in which said sidewall members are displaced along a predetermined angular path relative to the sidewalls of the article away from said first base member and laterally outwardly from one another;

core mold means disposed within the rectangular enclosure formed by said four sidewall members;

second mold means comprising a second base member movable between a closed position abutting one end of each of said four sidewall members for defining in conjunction with said core mold means and first mold means, when said four sidewall members are in said closed position, a mold cavity corresponding to said article and an open position in which said second mold means is displaced relative to said first mold means by a distance greater than the sidewall length of said article and along a path parallel to said four sidewalls of said article;

said core mold means comprising a first set of core elements rigidly secured to said first mold means and extending the major length of said sidewall members and a second set of core elements rigidly secured to said second mold means in registry with said first set of core elements and extending upwardly the remaining length of said sidewall members, said first and second sets of core elements being constructed and arranged for interlocking with one another when said second mold means is in its closed position to maintain a predetermined alignment of said first and second sets of core elements during molding of said article;

stripper ring means comprising a rectangular ring member of interior peripheral dimensions corresponding to the perimeter of said article and disposed adjacent the end of said sidewall members opposite said one ends and mechanically interlocked with said sidewall members for co-ordinated movement therewith and for engagement of the adjacent ends of the four sidewalls of the molded article to strip said article from said first set of core elements upon movement of said sidewall members from said closed to said open position; said stripper ring means further including ejector means supported by said second mold means and comprising a plurality of ejector rods for ejecting said article from said second set of core elements; and interlock means for mechanically coupling said four sidewall members to said second mold means for co-ordinated movement from said closed position toward said open position of said second mold means and for releasing said sidewall members from said second mold means at approximately the open position of said sidewall members and for permitting continued movement of said second mold means to its open position.

2. The mold of claim 1 in which said side wall members are each notched at their said opposite ends for cooperatively defining a shoulder portion of rectangular outline for seating said rectangular ring member of said stripper ring means and further in which said first mold means includes abutment members fixedly secured to each of said side wall members and overlying said ring member for interlocking said ring member with said side walls for motion along a first path parallel to said article side walls and for permitting free relative movement of said side wall members and said ring member along a path transverse to said first path.

3. The mold of claim 2 and further including limit means comprising a plurality of bolt members journaled in said first mold means for sliding movement and each having one end fixedly secured to said stripper ring means and having respective enlarged head portions for engaging said first mold means at a predetermined limit of travel of said bolt means for correspondingly limiting the travel of said retainer ring means and said four side wall members.

4. The mold of claim 3 in which said interlock means comprises respective first interlock members integral with said four side wall members and including first shoulder portions and further comprising respective second interlock members fixedly secured to said second mold means and including second shoulder portions overlying said first shoulder portions when said side wall members are in their closed position and said first and second shoulder portions moving laterally relative to one another as said second mold means and said sidewall members move toward their respective open positions so that said first and second shoulder portions clear one another as said four sidewall members reach their open position to release the interlock between said first and second interlock members thereby to permit independent movement of said four sidewall members and said second mold means.

5. The mold of claim 4 in which said first mold means includes an enlarged rectangular yoke portion surrounding and supporting said four sidewall members with said yoke portion having interior sidewalls contiguous respective outer walls of said four sidewall members and forming therewith respective planes inclined outwardly at an acute angle from the corresponding side walls of the article to be molded and further with tongue and groove interconnections being provided between respective ones of said sidewall members and corresponding interior side walls of said yoke portion to provide sliding motion between said yoke portion and said respective sidewall members, said tongue and groove interconnections being effected so as to cause said sidewall members to lift clear of a contiguous relationship with said yoke portion upon sliding movement of said sidewall members from their closed position to their open position thereby to prevent galling of the facing surfaces of said sidewall members and said yoke portion.

* * * * *